United States Patent

Solt

[15] 3,638,328
[45] Feb. 1, 1972

[54] FEED CONTROL SYSTEM FOR PROCESSING EQUIPMENT

[72] Inventor: Paul E. Solt, Allentown, Pa.
[73] Assignee: Fuller Company
[22] Filed: Aug. 27, 1970
[21] Appl. No.: 67,447

[52] U.S. Cl. ................................. 34/10, 34/56, 263/21 A, 302/35, 302/42
[51] Int. Cl. .......................................... F26b 3/08
[58] Field of Search ............... 34/10, 56; 110/28 J; 263/21 A; 302/35, 42

[56] References Cited

UNITED STATES PATENTS 2,363,281  11/1944  Arnold ........................................ 34/10
3,163,329  12/1964  Mornas ............................... 302/35 X
3,403,941  10/1968  Solt ......................................... 302/42

Primary Examiner—Carroll B. Dority, Jr.
Attorney—Jack L. Prather and Frank H. Thomson

[57] ABSTRACT

An arrangement for controlling the supply of material to processing equipment such as a fluidized bed reactor. The system employs a material-regulating valve which is responsive to the flow of gaseous fluid through the system. The gaseous fluid entrains the material and feeds it to the processing equipment. A condition such as the temperature of the processing equipment is continuously monitored and compared to a standard. The difference between the standard and the actual condition is used to control a variable restriction in the gaseous fluid supply line which in turn controls the amount of material admitted to the gaseous fluid supply line.

10 Claims, 2 Drawing Figures

PATENTED FEB 1 1972  3,638,328
FIG. I.
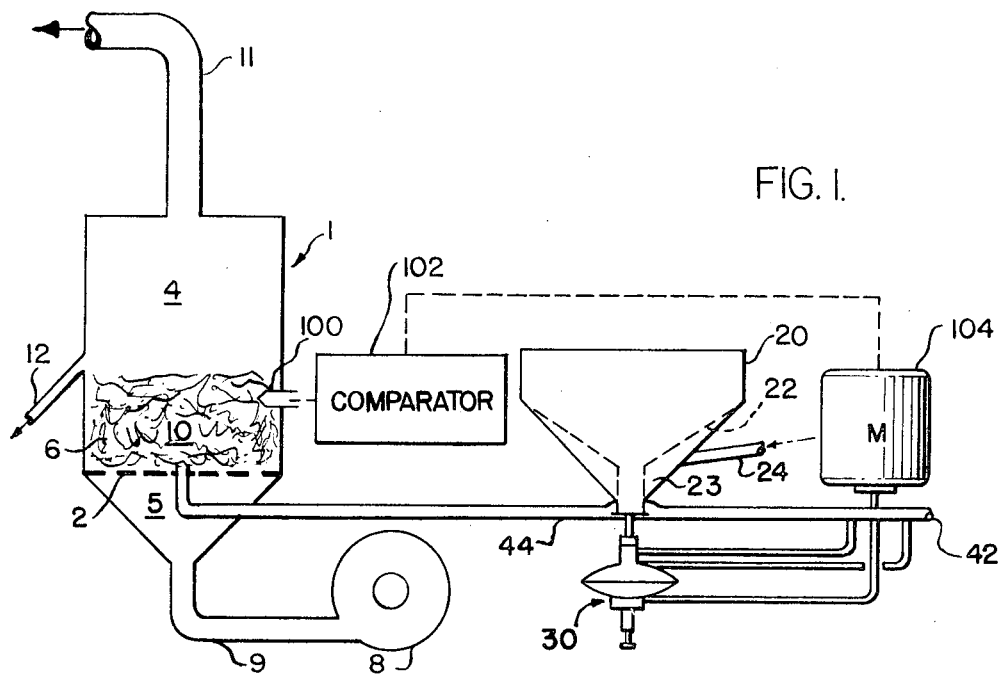
FIG. 2.
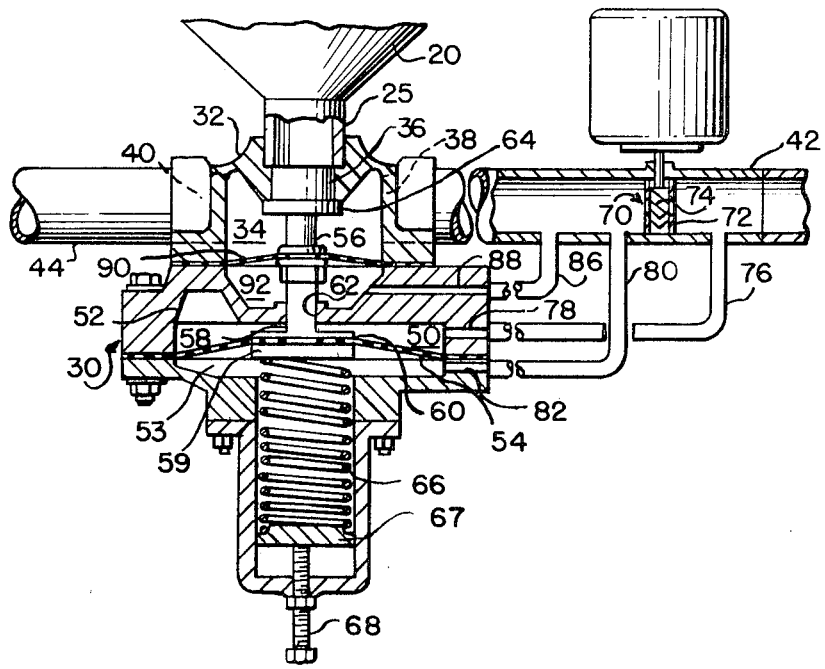
INVENTOR
PAUL E. SOLT
BY Frank H. Thomson
Jack L. Prather
ATTORNEY

FEED CONTROL SYSTEM FOR PROCESSING EQUIPMENT

BACKGROUND OF THE INVENTION

This invention relates to a control system for use in controlling the supply of material to be processed to a processing equipment such as a fluidized bed reactor.

The present invention takes advantage of the extremely sensitive pneumatic conveying system set forth in my prior U. S. Pat. No. 3,403,941 is controlling the supply of material to be processed to processing equipment. In my prior patent, the flow of air in the conveying system is sensed and used to control the amount of material admitted into the conveying system. The advantages of this arrangement are set forth in my prior patent.

In the conveying system of my prior patent, the airflow through the conveying line is sensed by the differential pressure across a restriction. When the differential pressure increases, more material is admitted to the conveying system, and conversely, when the differential pressure across the restriction decreases, less material is added to the conveying system. In my prior patent, an arrangement is set forth wherein the restriction may be varied to compensate for pressure variations in the system.

In thermal-processing equipment such as a fluidized bed reactor, a fluidized bed dryer or a fluidized bed cooler, the temperature within the equipment can be an indication of whether the proper amount of material to be processed is being supplied to the equipment. For example, if the thermal-processing equipment is a reactor wherein material to be processed is fed into the reactor and heat is applied to the material to carry out a chemical reaction, there is normally a particular amount of heat available within the reactor. If too much material is being supplied to the reactor, the temperature of the reactor will decrease whereas if too little material is being supplied to he reactor, the temperature will increase.

Prior arrangements for controlling the supply of material to be processed to the heat-processing equipment have often been complex and have not proved altogether satisfactory. With the present invention, apparatus such as shown in my aforementioned prior U.S. Patent is used to continuously control the supply of material to the processing equipment. It is believed that the present invention will provide a more accurate control of the supply of material to the thermal-processing equipment. A condition within the processing equipment is continuously monitored and a change in the monitored condition is used to regulate the supply of material to be processed to the processor.

SUMMARY

It is, therefore, the principal object of this invention to provide a novel control system for regulating the supply of material to be processed to the processing equipment.

It is a further object of this invention to provide a material supply control system for material-processing equipment which is continuously responsive to a particular condition within the material-processing equipment.

It is another object of this invention to provide a method of regulating the supply of material fed to material processing equipment which is continuously responsive to a condition in the equipment.

It is a still further object of this invention to provide a control system for regulating the supply of material to thermal-processing equipment which is responsive to the temperature within the thermal-processing equipment and serves to maintain a supply of material to the equipment which is compatible with a desired temperature.

In general, the foregoing and other objects will be carried out by providing in combination, a material processor, means for sensing a condition, and apparatus for supplying material to be processed to the material processor comprising means defining an entrainment chamber having a material inlet adapted to be connected to a source of material, a gaseous fluid inlet and a gaseous fluid-material outlet; first conduit means for supplying gaseous fluid to said gaseous fluid inlet; second conduit means connecting said gaseous fluid-material outlet to said material processor; means for sensing fluid flow in one of said first and second conduit means; means associated with said material inlet and responsive to the fluid flow in one of said first and second conduit means for controlling the introduction of material into the entrainment chamber; and means responsive to said means for sensing a condition for regulating said means in sensing fluid flow. The objects of the present invention are further carried out by providing a method of controlling the supply of material fed to thermal-processing equipment comprising the steps of establishing a flow of gaseous fluid to the thermal processing equipment, introducing material for direct entrainment with the flow of gaseous fluid, continuously sensing variations in the flow of gaseous fluid to the thermal-processing equipment, controlling the direct entrainment of material in the gaseous fluid in response to variations in fluid flow, sensing a condition in the thermal-processing equipment, and regulating the control of direct entrainment of material is response to the condition in the thermal-processing equipment.

BRIEF DESCRIPTION OF THE DRAWING

The invention will be described in connection with the annexed drawing wherein:

FIG. 1 is a diagrammatic view of the control system of the present invention as it is applied to a fluidized bed reactor; and FIG. 2 is a sectional view of the regulating valve employed by the present invention.

DESCRIPTION OF THE PREFERRED EMBODIMENT

The invention will be described as it is applied to a fluidized bed reactor which may be used for carrying out certain chemical reactions through the application of heat. It should be understood, however, that the control system of the present invention is equally applicable to other processing equipment such as a fluidized bed cooler, fluidized bed dryer or incinerator.

In FIG. 1, the fluidized bed reactor is generally indicated at 1 and includes a porous grid 2 which divides the reactor 1 into an upper chamber 4 and a lower or plenum chamber 5. Granular material 6 is disposed on the grid 2 within the upper chamber 4. This material may be sand or other inert material or the material to be processed or some other reactant. Air or other gaseous fluid is supplied from a blower 8 through a conduit 9 to the plenum chamber 5. The air passes through the grid 2 to fluidize the granular material and form a fluidized bed 10. A freeboard area is defined in the chamber 4 above the bed 10 as is well known in the art. Hot off-gases are discharged from the reactor 1 through a suitable conduit 11 and discharged to atmosphere through appropriate dust collecting apparatus (not shown). A conduit 12 is provided for discharging processed material as is well known in the art.

A supply of material to be processed is contained in a hopper 20 which is preferably a fluidized bin including a porous bin floor 22 which defines with the bottom wall of the hopper a plenum 23. Air or other gaseous fluid under pressure is supplied to the plenum 23 through a conduit 24 from a suitable source (not shown). The bin 20 includes a discharge port 25, best shown in FIG. 2.

a regulating valve such as that shown in my prior U.S. Pat. No. 3,403,941 and shown in FIG. 2 of the present application is mounted at the discharge opening 25 of the hopper 20 and generally indicated at 30. The regulating valve includes a casing 32 which defines a material entrainment chamber 34 having a material inlet 36 suitably connected to the outlet 25 of the hopper 20. The entrainment chamber 34 is also provided with a gaseous fluid inlet port 38 and a gaseous fluid-material outlet port 40.

A gaseous fluid supply conduit 42 is suitably connected to the port 38 for conducting gaseous fluid such as air under pressure from a source (not shown) to the entrainment chamber 34. A second conduit 44 is connected to the outlet port 40 and to the upper chamber 4 of the reactor 1 for conducting a gaseous fluid-material mixture from the entrainment chamber 34 to the fluidized bed 10. Although the material supply conduit 44 is shown as entering the chamber 4 through the grid 2, such is not intended to be a limiting factor.

The casing 32 also defines a control chamber 50 separate from the material entrainment chamber 34. The control chamber 50 is divided into an upper chamber 52 and a lower chamber 53 by means of a diaphragm 54. A modulating valve member 56 is mounted within the casing 32 and includes a stem 58 secured to the diaphragm 54 by means of disc plates 59 and 60 and reciprocates in a bore 62 in the wall between the control chamber 50 and the material entrainment chamber 34. A valve disc 64 is mounted on the upper end of the stem 58 for controlling the flow of material into the material entrainment chamber 34. The valve disc 64 is held in a normally seated position by means of a spring 66 acting between disc 59 and adjusting plate 67. An adjusting screw 68 is provided for adjusting the biasing force of spring 66.

A variable restriction 70 is mounted in the conduit 42 upstream of the control valve 30 to define a pressure differential means and includes a fixed wall 72 and an adjustable gate 74. A conduit 76 communicates with the upstream side of the variable restriction 70 and is connected to a port 78 communicating with the upper chamber 52 of the control chamber 50. A second conduit 80 communicates with the downstream side of the variable restriction 70 and a port 82 in the casing 32 to provide communication with the lower chamber 53 of the control chamber 50.

The variable restriction 70 defines a differential pressure arrangement whereby when the gate 74 is at least partially closed and there is a flow of fluid through the conduit 42, the pressure on the upstream side of the variable restriction 70 is greater than that of the downstream side. This difference in pressure is transferred through conduits 76 and 80 to chambers 52 and 53, respectively. Hence, the pressure in the chamber 52 is greater than the pressure in the chamber 53. This differential pressure acts on the diaphragm 54 and tends to move the valve 56 downwardly against the biasing force of spring 66 and thereby move the disc away from the port 36. Material to be processed can enter the entrainment chamber 34 where it is aerated by gaseous fluid from conduit 42 and conveyed through conduit 44 to the reactor 1. The differential pressure across the variable restriction 70 is an indication of fluid flow in the conduit 42. For a given opening in restriction 70, as fluid flow increases, the pressure on the upstream side of restriction 70 will be greater than that on the downstream side thereby causing the valve 56 to open further and permit more material from the hopper 20 to enter the entrainment chamber 34 and hence conveyed to the reactor 1. In the event a blockage occurs, no fluid will flow through conduit 42. There will be no differential pressure across restriction 70 and spring 66 will close valve 56. outlet;

A seal 90 has been provided in the entrainment chamber 34 for preventing material being conveyed from passing along stem 58 and interfering with the operation of the device. In order to balance the pressure in the entrainment chamber 34 and prevent the seal 90 from acting as a diaphragm a balance conduit 86 provides communication between the downstream side of the restriction 70 and a port 88 in the casing 32 and a balance chamber 92 on the underside of seal 90.

The control of the feed of material in response to a condition such as temperature within the reactor will now be described.

The reactor 1 is provided with a temperature sensing means 100 such as a thermocouple. The temperature sensing means continuously sends a signal to a comparator 102. The comparator compares the actual temperature of the reactor with a desired temperature. A signal indicating the difference between the desired temperature and the actual temperature is sent to a reversible motor means 104 which opens and closes gate 74 of variable restriction 70. If the gate is fully open, there will be no difference between the pressure on the upstream side of the restriction 70 and the pressure on the downstream side of the restriction 70. This will result in the valve 56 of the control valve 30 being held closed by spring 66 and hence no material will be supplied to the entrainment chamber 34 and the fluidized bed 10. As the gate 74 closes, for constant flow conditions, the pressure on the upstream side of the restriction 70 will begin to become greater than the pressure on the downstream side of the restriction 70 and the valve stem 56 will open to allow material to enter the entrainment chamber 34 and be supplied to the fluidized bed 6. In a thermal reactor, if the temperature decreases below the desired level, it can mean that the rate at which material to be processed is being supplied to the reactor is greater than the rate at which it can be processed in the reactor. If such a situation occurs, the difference between the actual temperature and the desired temperature will cause the comparator 102 to send a signal to motor 104 to open the gate 74 to thereby decrease the differential pressure across restriction 70 and decrease the supply of material to the bed 10. If the actual temperature increases, it may be an indication that the rate at which material to be processed is being supplied to the fluidized bed is less than the rate at which it can be processed in the reactor. If such a situation occurs, the difference between the actual temperature of the bed and the desired temperature of the bed will cause the comparator 102 to transmit a signal to motor 104 to close the gate 74 to thereby result in an increase in material supplied to the entrainment chamber 34 and hence the fluidized bed 10.

From the foregoing, it should be apparent that the objects of this invention have been carried out. The invention has been described in connection with a fluidized bed reactor wherein the condition to which the material feed system is responsive is temperature. It should be understood, however, that the invention could be used in other processing equipment such as a cooler wherein temperature is also the condition to which the material supply is responsive, or a dryer wherein the wetness of the material is sensed. It is intended that the foregoing description be merely that of a preferred embodiment and that the invention be limited solely by that which is within the scope of the appended claims.

I claim:

1. In combination with thermal-processing equipment, apparatus for supplying material to be processed to the thermal-processing equipment comprising:
   means defining an entrainment chamber having a material inlet port, a gaseous fluid inlet and a gaseous fluid-material outlet;
   first conduit means connected to said gaseous fluid inlet for conducting gaseous fluid to the entrainment chamber;
   second conduit means connecting said gaseous fluid-material outlet to the thermal-processing equipment;
   means associated with said material inlet port and responsive to the flow of gaseous fluid through said first conduit means for controlling the introduction of material into said entrainment chamber;
   pressure differential means mounted in said first conduit means for sensing the flow of gaseous fluid through said first conduit means and communicating with said means for controlling the introduction of material into the entrainment chamber for effecting said control; and
   means responsive to a condition in the thermal-processing equipment for controlling said pressure differential means to thereby regulate the introduction of material into the entrainment chamber and the amount of material supplied to the thermal-processing equipment.

2. The combination of claim 1 wherein said pressure differential means includes a variable restriction.

3. The combination of claim 2 wherein said apparatus further comprises means for sensing a condition in the thermal-processing equipment and said means responsive to a condition in the thermal-processing equipment includes means for comparing the sensed condition in the thermal-processing equipment to a standard temperature and motor means for regulating said variable restriction in response to a deviation from the standard.

4. A method of controlling the supply of material fed to thermal-processing equipment comprising the steps of establishing a flow of gaseous fluid to the thermal-processing equipment, introducing material for direct entrainment with the flow of gaseous fluid, continuously sensing variations in the flow of gaseous fluid to the thermal-processing equipment, controlling the direct entrainment of material in the gaseous fluid in response to variations in gaseous fluid flow, sensing a condition in the thermal-processing equipment, and regulating the control of direct entrainment of material in response to the condition in the thermal-processing equipment.

5. In combination, a material processor, means for sensing a condition in the processor, and apparatus for supplying material to be processed to the material processor, said apparatus comprising means defining a material entrainment chamber having a material inlet adapted to be connected to a source of material, a gaseous fluid inlet and a gaseous fluid-material outlet; first conduit means for supplying gaseous fluid to said gaseous fluid inlet; second conduit means connecting said gaseous fluid-material outlet to said material processor; means for sensing fluid flow in one of said first and second conduit means; means associated with said material inlet and responsive to the fluid flow in one of said first and second conduit means for controlling the introduction of material into the material entrainment chamber; and means responsive to said means for sensing a condition for regulating said means for sensing fluid flow.

6. The combination of claim 5 wherein said means for sensing the fluid flow includes a variable restriction mounted in one of said first and second conduits whereby a differential pressure is established across the variable restriction and said means for controlling the introduction of material into the material entrainment chamber includes valve means responsive to the differential pressure across said variable restriction.

7. The combination of claim 6 wherein said apparatus further comprises motor means for opening and closing said variable restriction and said means for sensing a condition in the material processor includes comparator means for comparing the sensed condition to a standard and controlling said motor means in response to a deviation from the standard.

8. The combination of claim 7 wherein said variable restriction is mounted in said first conduit.

9. The combination of claim 8 wherein said means for sensing a condition is a temperature measuring means and said motor means opens said variable restriction when the temperature in the material processor is greater than the standard.

10. The combination of claim 9 wherein said material processor is a fluidized bed reactor.

* * * * *